United States Patent
Tanaka (10) Patent No.: US 8,149,137 B2
(45) Date of Patent: Apr. 3, 2012

(54) SPEED LIMIT ANNOUNCING DEVICE, METHOD FOR ANNOUNCING SPEED LIMIT, AND COMPUTER PROGRAM PRODUCT FOR THE SAME

(75) Inventor: Hiroyuki Tanaka, Kariya (JP)

(73) Assignee: Denso Corporation, Kariya (JP)

( * ) Notice: Subject to any disclaimer, the term of this patent is extended or adjusted under 35 U.S.C. 154(b) by 375 days.

(21) Appl. No.: 12/505,637

(22) Filed: Jul. 20, 2009

(65) Prior Publication Data

US 2010/0013669 A1 Jan. 21, 2010

(30) Foreign Application Priority Data

Jul. 21, 2008 (JP) ................................. 2008-187997

(51) Int. Cl.
G08G 1/09 (2006.01)
(52) U.S. Cl. ......... 340/905; 340/441; 340/439; 340/540
(58) Field of Classification Search .................. 340/905, 340/441, 439, 540
See application file for complete search history.

(56) References Cited

U.S. PATENT DOCUMENTS

| | | | | |
|---|---|---|---|---|
| 3,976,970 A | * | 8/1976 | Tuffet et al. | 340/905 |
| 2002/0126023 A1 | * | 9/2002 | Awada | 340/905 |
| 2007/0067086 A1 | * | 3/2007 | Rothschild | 701/93 |
| 2007/0115113 A1 | * | 5/2007 | Wang | 340/539.13 |
| 2007/0216521 A1 | * | 9/2007 | Guensler et al. | 340/439 |
| 2008/0150786 A1 | * | 6/2008 | Breed | 342/53 |

FOREIGN PATENT DOCUMENTS

| | | |
|---|---|---|
| CN | 101033976 | 9/2007 |
| JP | 09-126792 A | 5/1997 |
| JP | 10-19596 A | 1/1998 |
| JP | A-2004-050967 | 2/2004 |
| JP | A-2004-347470 | 12/2004 |
| JP | A-2004-348468 | 12/2004 |
| JP | A-2006-071539 | 3/2006 |
| JP | 2006-177856 A | 7/2006 |
| JP | 2008-39401 A | 2/2008 |
| JP | A-2008-298547 | 12/2008 |

OTHER PUBLICATIONS

OA dated mailed on Apr. 27, 2010 in the corresponding JP application No. 2008-187997.
Office Action mailed on Mar. 15, 2011 issued in the corresponding Chinese Patent Application No. 2009-10151091.8 (English translation enclosed).

* cited by examiner

*Primary Examiner* — Daryl Pope
(74) *Attorney, Agent, or Firm* — Posz Law Group, PLC

(57) ABSTRACT

A speed limit announcing device for a vehicle includes: an information obtaining element for obtaining information of a speed limit of a following road, wherein the vehicle is supposed to pass through an intersection and to run on the following road after the intersection; and an announce element for announcing the information of the speed limit of the following road when the vehicle runs on a current road before the intersection.

17 Claims, 4 Drawing Sheets

SPEED LIMIT ANNOUNCING DEVICE, METHOD FOR ANNOUNCING SPEED LIMIT, AND COMPUTER PROGRAM PRODUCT FOR THE SAME

CROSS REFERENCE TO RELATED APPLICATION

This application is based on Japanese Patent Application No. 2008-187997 filed on Jul. 21, 2008, the disclosure of which is incorporated herein by reference.

FIELD OF THE INVENTION

The present invention relates to a speed limit announcing device for a vehicle, a method for announcing a speed limit and a computer program product for announcing a speed limit.

BACKGROUND OF THE INVENTION

Conventionally, a technique for announcing speed limit of a road to a driver of a vehicle is well known. For example, JP-A-H10-19596 and JP-A-2006-177856 disclose the technique.

The present inventor has proposed to avoid traffic violation in the technique for announcing the speed limit information to the driver.

SUMMARY OF THE INVENTION

In view of the above-described problem, it is an object of the present disclosure to provide a speed limit announcing device for a vehicle, a method for announcing a speed limit, and a computer program product for announcing a speed limit.

According to an aspect of the present disclosure, a speed limit announcing device for a vehicle includes: an information obtaining element for obtaining information of a speed limit of a following road, wherein the vehicle is supposed to pass through an intersection and to run on the following road after the intersection; and an announce element for announcing the information of the speed limit of the following road when the vehicle runs on a current road before the intersection. Since the device announces the speed limit information of the following road, violation of traffic regulation is avoided. Further, since the announcement is performed before the vehicle reaches the intersection, the violation of the traffic regulation is effectively avoided.

According to a second aspect of the present disclosure, a computer program product in a computer readable medium for announcing a speed limit, the product includes: an instruction for obtaining information of a speed limit of a following road, wherein a vehicle is to pass through an intersection and to run on the following road after the intersection; and an instruction for announcing the information of the speed limit of the following road when the vehicle runs on a current road before the intersection. Since the speed limit information of the following road is announced, violation of traffic regulation is avoided. Further, since the announcement is performed before the vehicle reaches the intersection, the violation of the traffic regulation is effectively avoided.

According to a third aspect of the present disclosure, a method for announcing a speed limit includes: obtaining information of a speed limit of a following road, wherein a vehicle is to pass through an intersection and to run on the following road after the intersection; and announcing the information of the speed limit of the following road when the vehicle runs on a current road before the intersection. Since the speed limit information of the following road is announced, violation of traffic regulation is avoided. Further, since the announcement is performed before the vehicle reaches the intersection, the violation of the traffic regulation is effectively avoided.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
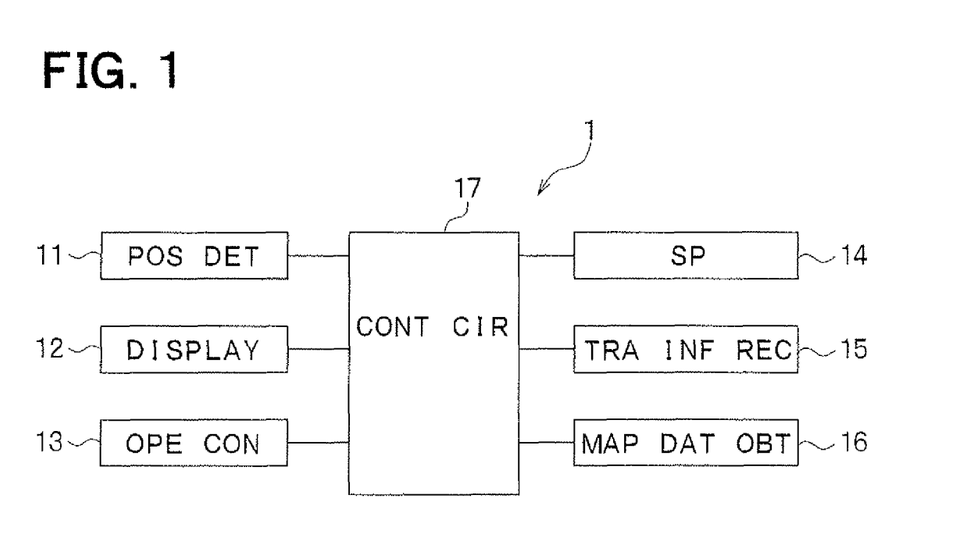
FIG. 1 is a diagram showing a navigation device.

FIG. 1 shows a hard ware of a vehicle navigation device 1 as a speed limit announcing device. The navigation device 1 includes a position detector 11, an image display device 12, an operation console 13, a speaker 14, a traffic information receiver 15, a map data obtaining element 16 and a control circuit 17.

The position detector 11 includes an acceleration sensor, a geomagnetic sensor, a gyro sensor, a vehicle speed sensor, a GPS receiver and the like, which are not shown in FIG. 1. Information based on characteristics of these sensors for specifying a current position, a driving direction and vehicle speed of the vehicle is output to the control circuit 17.

The image display 12 displays an image based on an image signal output from the control circuit 17. The display image is, for example, a map having a center as a current position of the vehicle.

The operation console 13 includes an input element such as multiple mechanical switches and touch switches. The mechanical switches are arranged on the device 1. The touch switches are arranged on a touch panel, which is overlapped on a screen of the display 12. A signal corresponding to operation of a user such as pushing the mechanical switch and/or touching the touch switch is input to the control circuit 17.

The traffic information receiver 15 is a radio receiver for receiving traffic jam information, traffic control information and the like, which are transmitted by wireless from a FM radio broadcast station or a road station arranged along with a road. Further, the receiver 15 outputs the information to the control circuit 17.

The map data obtaining element 16 reads data from a nonvolatile memory medium such as a DVD, a CD, a HDD and the like. The map data obtaining element 16 may write data in the memory medium. The memory medium stores a program to be executed by the control circuit 17, map data for route guidance, and the like.

The map data has road data and facility data. The road data includes information about an ID, position information, road type information and speed limit information of a link, and position information and type information of a node, and connection relationship information between the node and the link. The link is defined as a road between two adjacent traffic cross sections. The road type information is, for example, information for distinguishing an express way and an open road. The facility data includes a record in each facility. Each record includes data showing name, position, address and type of facility.

The control circuit 17 as a computer includes a CPU, a RAM, a ROM, a I/O device and the like. The CPU executes a program for operating the navigation device 1. The program is read out from the ROM or the map data obtaining element 16. When the program is executed, the information is read from the RAM, the ROM and the map data obtaining element 16. The circuit 17 writes information to the memory medium in the map data obtaining element 16 and the RAM. The circuit 17 communicates with the position detector 11, the display 12, the console 13, the speaker 14 and the receiver 15.

Process performed by the program executed by the control circuit 17 includes current position detection process, map data display process, route guidance calculation process, route guidance process and the like.

The current position detection process provides to specify the current position and the driving direction of the vehicle based on the signal form the position detector 11 by using technique for conventional map matching.

The map display process provides to display the map on the display 12. The map relates to a specific region around the current position of the vehicle. The information for displaying the map is obtained from the map data.

The route guidance calculation process provides to calculate the optimum route from the current position to a destination. The user inputs the destination by using the operation console 13.

The navigation device 1 starts to execute the route guidance process just after the vehicle moves under a condition that the optimum route is calculated. The route guidance process provides to output voice guidance such as instruction to turn right or left from the speaker 14 when the vehicle reaches near an intersection on the guidance route at which the vehicle turns right or left. Further, the route guidance process provides to display an enlarged map of the intersection on the display 12. Thus, the route guidance process provides to guide the driving route along with the guidance route.

The control circuit 17 executes speed limit announcing process. The speed limit announcing process provides to obtain the speed limit information of the road on which the vehicle currently drives and the following road along with the guidance route beyond the intersection. The speed limit announcing process provides to announce the speed limit information to the driver of the vehicle during the vehicle drives on the road.

Figure 2:
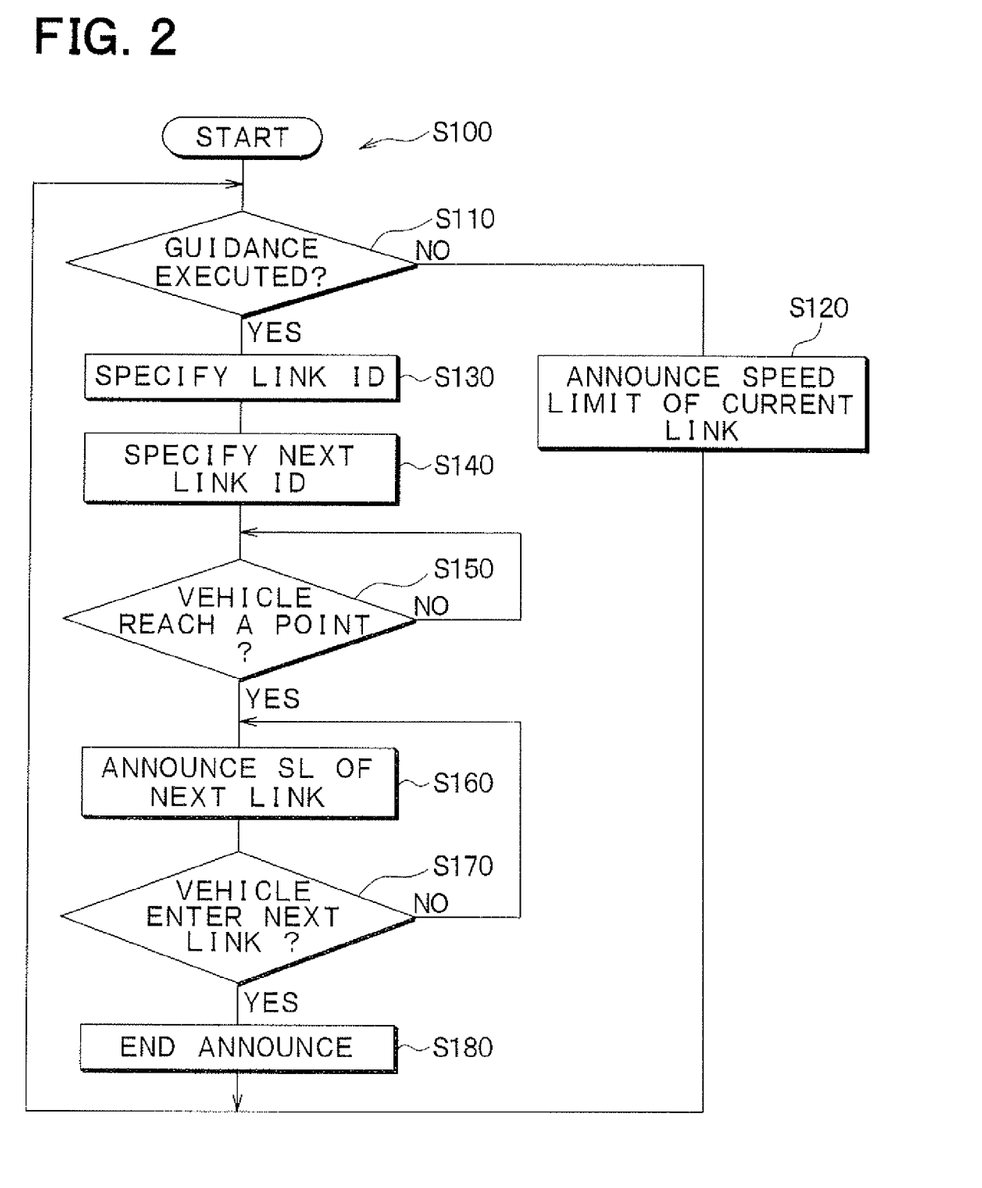
FIG. 2 is a flowchart showing a program executed by a control circuit.

The control circuit 17 executes the speed limit announcing process by performing the program 100 shown in FIG. 2. In the program 100, the control circuit 17 determines in Step S110 whether the route guidance process is executed at the present moment. When the circuit determines that the route guidance process is not executed, it goes to Step S120. When the route guidance process is executed, it goes to Step S130.

In Step S120, a link ID of a link corresponding to the driving road, on which the vehicle drives, is specified by the current position detection process. The information of the speed limit corresponding to the specified link, i.e., a driving link, is obtained from the map data. The obtained speed limit information is displayed ion the display 12. Then, it returns to Step S110.

In Step S130, similar to Step S120, the link ID of the link corresponding to the road, on which the vehicle runs, is specified. In Step S140, the following link corresponding to the following road along with the guidance route is specified.

Further, the speed limit information corresponding to the following link is obtained from the map data.

The following link is determined based on the guidance route. Specifically, the following link is a link along with the guidance route just after an intersection as an approach intersection, which is connected to the driving link.

In Step S150, it is determined whether the vehicle reaches an announce point, so that the device 1 waits until the vehicle arrives the announce point. The announce point may be a predetermined distance such as 100 meters short of the approach intersection on the guidance route. The announce point may be a point at which the navigation device 1 starts to display the enlarged map of the intersection when the approach intersection is the guidance intersection.

The announce point may be a point at which the control circuit 17 controls the image display 12 to display a lane. Here, lane display process is to display multiple approach lanes toward the approach intersection along with the driving link and a direction to a departure link from the intersection corresponding to each approach lane.

The departure link corresponding to the approach lane is a link, to which the vehicle can be entered from the approach intersection, when the vehicle enters into the approach intersection from the approach lane. The information about the departure link corresponding to each approach lane may be preliminary stored in the map data. The direction of the departure link is a driving direction from the approach intersection to the departure link.

When the vehicle reaches the announce point, in Step S160, the information about the speed limit of the following link is announced. The method for announcing the information may be sound announce with using the speaker 14. Alternatively, the method may be image announce with using the image display 12. Alternatively, the method may be sound announce and image announce with using the speaker 14 and the display 12.

When the announce is performed by sound announce, for example, a voice announce such as "Please turn left at the next intersection. The speed limit will be 60 km/h," or "Please turn left. The speed limit will be changed. Please be careful to obey traffic regulations" may be performed.

Figure 3:
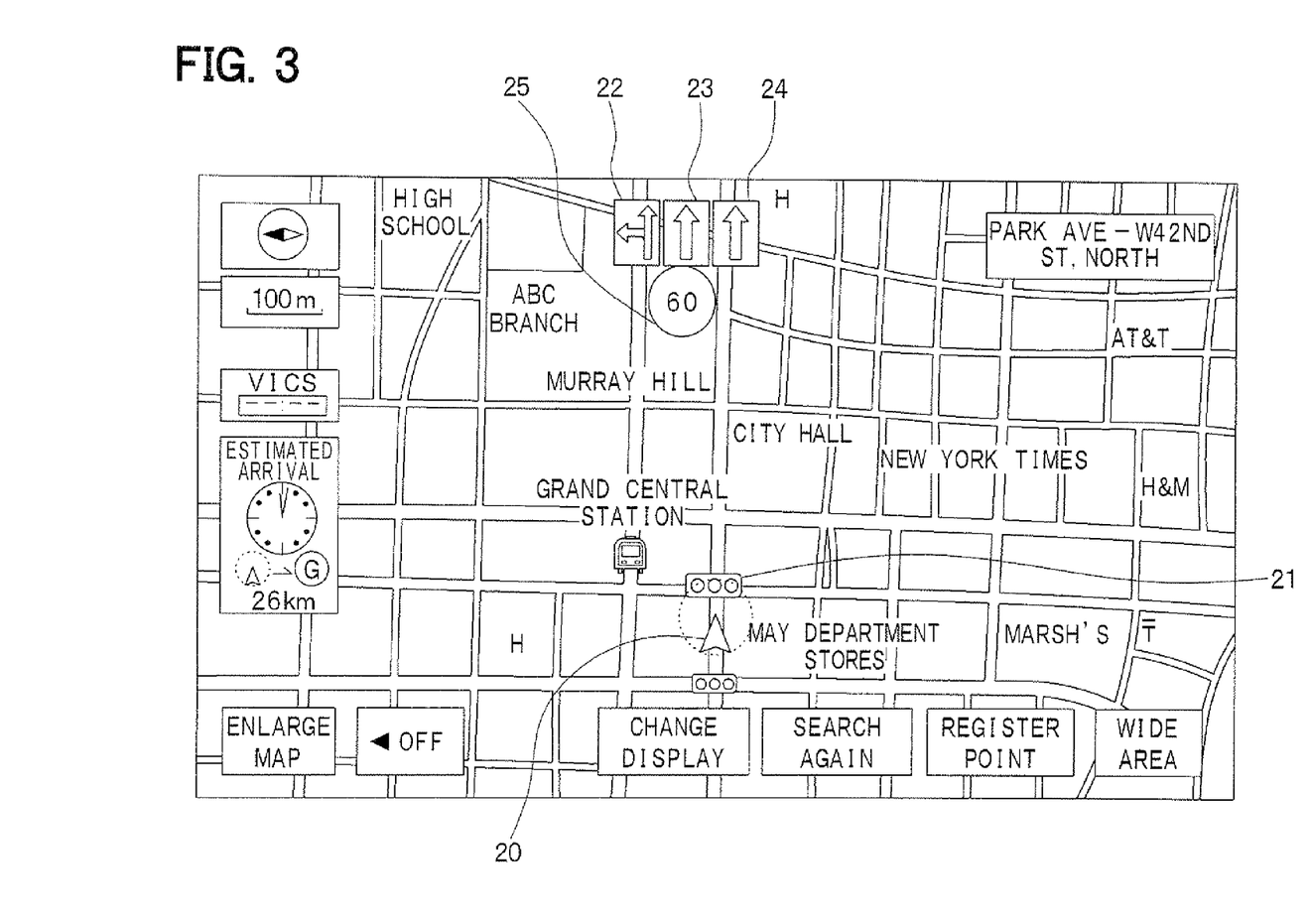
FIG. 3 is a diagram showing an image of speed limit announcement.

When the announce is performed by image announce, for example, as shown in FIG. 3, a mark 20 corresponding to the current position of the vehicle is displayed on the map. When the vehicle drives along with the guidance route, the vehicle will enter into the approach intersection 21. Multiple approach lanes to the intersection 21 are displayed as approach lane images 22-24. Further, the image 25 of the information about the speed limit of the following road is displayed on the display 12 near the image 23 of the approach lane corresponding to the departure lane for driving toward the following link along with the guidance route. Specifically, the image 25 is displayed under the lane image 23 as the approach lane rather than the lane images 22, 24.

Figure 4:
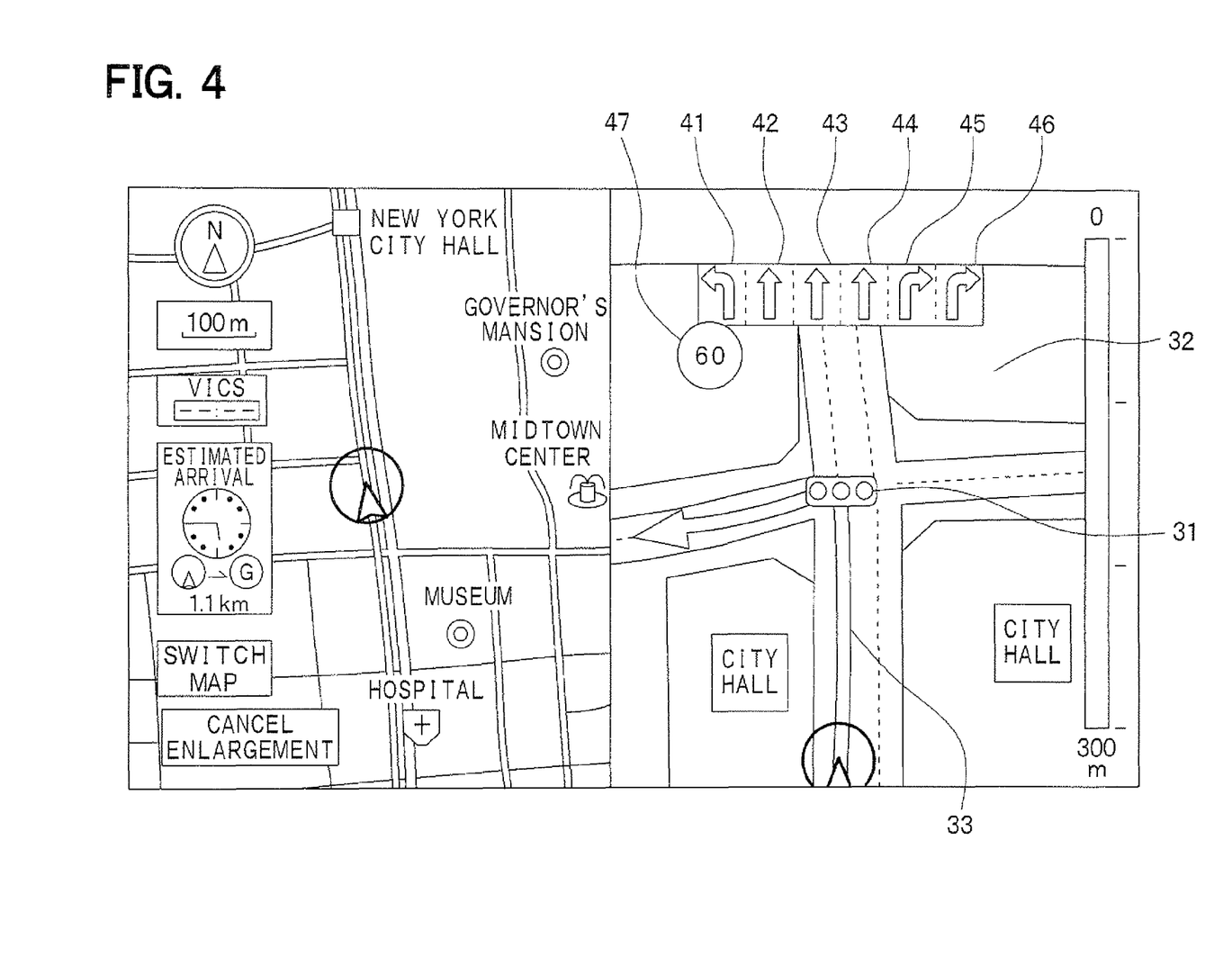
FIG. 4 is a diagram showing another image of speed limit announcement.

As shown in FIG. 4, when the enlarged view 32 around the intersection is displayed on the display 12, multiple approach lane images 41-46 of the lanes to approach the intersection 31 along with the guidance route are displayed. Further, the image 47 of the information about the speed limit of the following road is displayed on the display 12 near the image 41 of the approach lane corresponding to the departure lane for proceeding toward the following link along with the guidance route 33. Specifically, the image 47 is displayed under the lane image 41 as the approach lane rather than the lane images 42-46.

In Step S170, the navigation device 1 determines whether the vehicle passes through the intersection and enters into the following link. When it is determined that the vehicle enters into the following link, it proceeds to Step S180. When it is determined that the vehicle does not enter into the following link, it returns to Step S160. In Step S180, the announce for the information about the speed limit of the following link ends. Then, it returns to Step S110.

By executing the program 100, the control circuit 17 obtains the information about the road, on which the vehicle runs, the information about the following road along with the guidance route and ahead of the intersection, and the information about the speed limit of the following road in Steps S130, S140 during the route guidance process is performed. When the vehicle runs on the road before the intersection, and the vehicle reaches the announce point, at which the announce for the following road is performed, the information about the speed limit of the following road is announced to the driver of the vehicle with an image guidance and/or voice guidance in Step S160. When the vehicle enters into the following road, the device stops the announce in Step S180.

The navigation device 1 announces the information about the speed limit of the following road ahead of the current road on which the vehicle runs, so that the device provides to avoid traffic violation for the driver. Further, the information of the speed limit relates to the following road, which is next to the intersection, to which the vehicle approaches from the current road. Accordingly, the announce timing is effective for avoiding the traffic violation.

The navigation device 1 displays multiple approach lanes to the intersection along with the current road on the display 12 when the information about the speed limit of the following road is announced. Further, the device 1 displays the information about the speed limit of the following road near the approach lane image for the following road. Thus, the relationship between the speed limit of the following road and the approach lane for the intersection to entering into the following road is effectively impressed to the driver.

OTHER EMBODIMENTS

Although the link of the following road is along with the guidance route, the link may not be along with the guidance route. For example, the information about speed limit of all links other than the link along with the guidance route may be announced. Alternatively, the information about speed limit of a part of links other than the link along with the guidance route may be announced.

In Step S130, the control circuit 17 obtains the information about the speed limit of the current road, on which the vehicle runs. In Step S150, when the vehicle reaches the announce point, and the speed limit of the current road is different from the speed limit of the following road, it may go to Step S160. In this case, when Step S150 is repeatedly performed, and the vehicle enters into the next link, it may return to Step S110.

The control circuit 17 announces the information about the speed limit of the following link when the speed limit of the current link is different from the speed limit of the following link. The device 1 prohibits the announce of the information about the speed limit of the following link when the speed limit of the current link is equal to the speed limit of the following link.

The risk for violating the traffic regulation in a case where the speed limit of the current link is different from the speed limit of the following link is higher than the risk for violating the traffic regulation in a case where the speed limit of the current link is equal to the speed limit of the following link. Accordingly, when the speed limit of the current link is different from the speed limit of the following link, the announce for the speed limit of the following road is effectively performed, so that the device 1 effectively prohibits the traffic regulation violation.

The control circuit 17 may perform Step S160 when the vehicle reaches the announce point, and there is no traffic jam on the following road. It is determined based on the information received by the receiver 15 whether the traffic of the next link is heavy. In this case, when the control circuit 17 repeatedly executes Step S150, and the vehicle enters into the next link, it may return to Step S110.

Thus, when it is determined that the driver cannot drive the vehicle on the following road with a speed more than the speed limit because of the traffic jam according to the traffic information received by the receiver 15, the device 1 may not announce the information about the speed limit of the following road.

The control circuit 17 may prohibit the announce of the information of the speed limit of the following link based on a prohibition condition such as traffic jam. In this case, since it is not possible for the driver to violate the traffic regulation such as the speed limit because the traffic of the following road is heavy, the device does not announce the information of the speed limit of the following link. As a result, when the traffic of the following link is not heavy the device effectively announce the speed limit of the following link. Thus, the announcement of the information of the speed limit is effectively performed only when it is necessary to announce the information.

The control circuit 17 may execute Step S160 only when the vehicle reaches the announce point, and a distance on the following road along with the guidance route on which the vehicle goes straight is equal to or larger than a predetermined distance such as 10 meters. Specifically, when it is considered that the vehicle run straight on the following road by the distance more than the predetermined distance, the device 1 executes Step S160. In this case, when the control circuit 17 repeatedly executes Step S150, and the vehicle enters into the next link, it may return to Step S110.

Thus, when the vehicle successively turns left and/or right with a short distance along with the guidance route, so that the straight distance of the following road is shorter than the reference distance such as 100 meters, the announce of the information about the speed limit of the following link is prohibited. Thus, when the possibility to violate the traffic regulation of the speed limit is low since the straight distance of the road is very short, the device prohibits the announce of the speed limit of the following link. As a result, the announcement of the information of the speed limit is effectively performed only when it is necessary to announce the information.

Further, the control circuit 17 may always execute Step S160 so that the announce of the information about the speed limit of the following link is performed within a predetermined time interval such as 30 minutes since the vehicle switches from an express way to an ordinary road even when the above prohibition conditions of announcement are satisfied. Specifically, even when the straight distance of the following road is shorter than 10 meters, the vehicle successively turns left and/or right with a short distance such as 100 meters, or the traffic of the following road is heavy, the prohibition of announcement is not performed.

Just after the vehicle gets off the expressway and runs on the ordinary road, possibility of driving the vehicle with high speed may be high. Accordingly, within a reference time period since the vehicle gets off the expressway, the device 1 announces the information of the speed limit of the following link even when the above prohibition conditions as satisfied. Thus, the possibility of violation of the traffic regulation is effectively reduced.

The control circuit 17 executes the above functions with using the program 100. Alternatively, hard ware having the same functions may be used for executing the above functions. Here, the hard ware is, for example, a FPGA capable of programming a circuit constitution.

The navigation device 1 is mounted on the vehicle so that the device 1 is an in-vehicle device. Alternatively, the device 1 may be a mobile navigation device so that a person can bring the device 1. Thus, the driver may bring the mobile navigation device in a vehicle. Alternatively, the device 1 may be a cell phone having navigation function. The device 1 may be a PDA having navigation function.

The above disclosure has the following aspects.

According to an aspect of the present disclosure, a speed limit announcing device for a vehicle includes: an information obtaining element for obtaining information of a speed limit of a following road, wherein the vehicle is supposed to pass through an intersection and to run on the following road after the intersection; and an announce element for announcing the information of the speed limit of the following road when the vehicle runs on a current road before the intersection. Since the device announces the speed limit information of the following road, violation of traffic regulation is avoided. Further, since the announcement is performed before the vehicle reaches the intersection, the violation of the traffic regulation is effectively avoided.

Alternatively, the device may further include: an image display. The announce element controls the image display to display a plurality of approach lanes, which approach the intersection, and the announce element controls the image display to display the information of the speed limit of the following road in association with one of the approach lanes, which corresponds to the following road. In this case, the relationship between the speed limit and the approach lane is strongly impressed for a driver of the vehicle.

Alternatively, the announce element may announce the information when a speed limit of the current road is different from the speed limit of the following road, and the announce element may prohibit announcement of the information when the speed limit of the current road is equal to the speed limit of the following road. Further, the announce element may announce the information within a predetermined time period since the vehicle gets off an expressway and starts to run on an ordinary road even when the speed limit of the current road is equal to the speed limit of the following road.

Alternatively, the announce element may prohibit announcement of the information when traffic of the following road is heavy. Further, the announce element may announce the information within a predetermined time period since the vehicle gets off an expressway and starts to run on an ordinary road even when the traffic of the following road is heavy.

Alternatively, the announce element may prohibit announcement of the information when a straight distance of the following road is shorter than a predetermined distance. Further, the announce element may announce the information within a predetermined time period since the vehicle gets off an expressway and starts to run on an ordinary road even when the straight distance of the following road is shorter than the predetermined distance.

According to a second aspect of the present disclosure, a computer program product in a computer readable medium for announcing a speed limit, the product includes: an instruction for obtaining information of a speed limit of a following road, wherein a vehicle is to pass through an intersection and to run on the following road after the intersection; and an instruction for announcing the information of the speed limit of the following road when the vehicle runs on a current road before the intersection. Since the speed limit information of the following road is announced, violation of traffic regulation is avoided. Further, since the announcement is performed before the vehicle reaches the intersection, the violation of the traffic regulation is effectively avoided.

According to a third aspect of the present disclosure, a method for announcing a speed limit includes: obtaining information of a speed limit of a following road, wherein a vehicle is to pass through an intersection and to run on the following road after the intersection; and announcing the information of the speed limit of the following road when the vehicle runs on a current road before the intersection. Since the speed limit information of the following road is announced, violation of traffic regulation is avoided. Further, since the announcement is performed before the vehicle reaches the intersection, the violation of the traffic regulation is effectively avoided.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A speed limit announcing device for a vehicle comprising:
    an information obtaining element for obtaining information of a speed limit of a following road, wherein the vehicle is supposed to pass through an intersection and to run on the following road after the intersection;
    an announce element for announcing the information of the speed limit of the following road instead of a current road when the vehicle runs on the current road before the intersection; and
    an image display,
    wherein the announce element controls the image display to display a plurality of approach lanes, which approach the intersection, and
    wherein the announce element controls the image display to display the information of the speed limit of the following road in association with one of the approach lanes, which corresponds to the following road.

2. A speed limit announcing device for a vehicle comprising:
    an information obtaining element for obtaining information of a speed limit of a following road, wherein the vehicle is supposed to pass through an intersection and to run on the following road after the intersection; and
    an announce element for announcing the information of the speed limit of the following road instead of a current road when the vehicle runs on the current road before the intersection,
    wherein the announce element announces the information when a speed limit of the current road is different from the speed limit of the following road, and
    wherein the announce element prohibits announcement of the information when the speed limit of the current road is equal to the speed limit of the following road.

3. The device according to claim 2,
wherein the announce element announces the information within a predetermined time period since the vehicle gets off an expressway and starts to run on an ordinary road even when the speed limit of the current road is equal to the speed limit of the following road.

4. A speed limit announcing device for a vehicle comprising:
an information obtaining element for obtaining information of a speed limit of a following road and traffic of the following road, wherein the vehicle is supposed to pass through an intersection and to run on the following road after the intersection; and
an announce element for announcing the information of the speed limit of the following road instead of a current road when the vehicle runs on the current road before the intersection,
wherein the announce element prohibits announcement of the information when the traffic of the following road is heavy.

5. The device according to claim 4,
wherein the announce element announces the information within a predetermined time period since the vehicle gets off an expressway and starts to run on an ordinary road even when the traffic of the following road is heavy.

6. A speed limit announcing device for a vehicle comprising:
an information obtaining element for obtaining information of a speed limit of a following road, wherein the vehicle is supposed to pass through an intersection and to run on the following road after the intersection; and
an announce element for announcing the information of the speed limit of the following road instead of a current road when the vehicle runs on the current road before the intersection,
wherein the announce element prohibits announcement of the information when a straight distance of the following road is shorter than a predetermined distance.

7. The device according to claim 6,
wherein the announce element announces the information within a predetermined time period since the vehicle gets off an expressway and starts to run on an ordinary road even when the straight distance of the following road is shorter than the predetermined distance.

8. A non-transitory computer-readable medium comprising instructions being executed by a computer, the instructions including a computer-implemented method for announcing a speed limit, the instructions for implementing the steps of:
obtaining information of a speed limit of a following road, wherein a vehicle is to pass through an intersection and to run on the following road after the intersection;
announcing the information of the speed limit of the following road when the vehicle runs on a current road before the intersection, instead of the speed limit of the current road;
displaying a plurality of approach lanes, which approach the intersection; and
displaying the information of the speed limit of the following road in association with one of the approach lanes, which corresponds to the following road.

9. A method for announcing a speed limit comprising:
obtaining, in a speed limit announcing device, information of a speed limit of a following road, wherein a vehicle is to pass through an intersection and to run on the following road after the intersection;
announcing, in the speed limit announcing device, the information of the speed limit of the following road when the vehicle runs on a current road before the intersection, instead of the speed limit of the current road;
displaying a plurality of approach lanes, which approach the intersection; and
displaying the information of the speed limit of the following road in association with one of the approach lanes, which corresponds to the following road.

10. A method for announcing a speed limit comprising:
obtaining, in a speed-limit announcing device, information of a speed limit of a following road, wherein a vehicle is to pass through an intersection and to run on the following road after the intersection; and
announcing, in the speed limit announcing device, the information of the speed limit of the following road when the vehicle runs on a current road before the intersection, instead of the speed limit of the current road,
wherein the announcing the information is performed when a speed limit of the current road is different from the speed limit of the following road, and
wherein the announcing the information is prohibited when the speed limit of the current road is equal to the speed limit of the following road.

11. The method according to claim 10,
wherein the announcing the information is performed within a predetermined time period since the vehicle gets off an expressway and starts to run on an ordinary road even when the speed limit of the current road is equal to the speed limit of the following road.

12. A method for announcing a speed limit comprising:
obtaining, in a speed-limit announcing device, information of a speed limit of a following road and traffic of the following road, wherein a vehicle is to pass through an intersection and to run on the following road after the intersection; and
announcing, in the speed-limit announcing device, the information of the speed limit of the following road when the vehicle runs on a current road before the intersection, instead of the speed limit of the current road,
wherein the announcing the information is prohibited when the traffic of the following road is heavy.

13. The method according to claim 12,
wherein the announcing the information is performed within a predetermined time period since the vehicle gets off an expressway and starts to run on an ordinary road even when the traffic of the following road is heavy.

14. A method for announcing a speed limit comprising:
obtaining, in a speed-limit announcing device, information of a speed limit of a following road, wherein a vehicle is to pass through an intersection and to run on the following road after the intersection; and
announcing, in the speed-limit announcing device, the information of the speed limit of the following road when the vehicle runs on a current road before the intersection, instead of the speed limit of the current road,
wherein the announcing the information is prohibited when a straight distance of the following road is shorter than a predetermined distance.

15. The method according to claim 14,
wherein the announcing the information is performed within a predetermined time period since the vehicle gets off an expressway and starts to run on an ordinary road even when the straight distance of the following road is shorter than the predetermined distance.

16. A speed limit announcing device for a vehicle comprising:
- an information obtaining element for obtaining information of a speed limit of a following road, wherein the vehicle is supposed to pass through an intersection and to run on the following road after the intersection; and
- an announce element for announcing the information of the speed limit of the following road when the vehicle runs on a current road before the intersection, instead of the speed limit of the current road,
- wherein the announce element announces the information within a predetermined time period since the vehicle gets off an expressway and starts to run on an ordinary road even when a prohibition condition for prohibiting announcement of the information of the speed limit is met.

17. A method for announcing a speed limit comprising:
- obtaining, in a speed-limit announcing device, information of a speed limit of a following road, wherein a vehicle is to pass through an intersection and to run on the following road after the intersection; and
- announcing, in the speed-limit announcing device, the information of the speed limit of the following road when the vehicle runs on a current road before the intersection, instead of the speed limit of the current road,
- wherein the announcing the information is performed within a predetermined time period since the vehicle gets off an expressway and starts to run on an ordinary road even when a prohibition condition for prohibiting announcement of the information of the speed limit is met.

* * * * *